United States Patent

Chao et al.

Patent Number: 5,305,111
Date of Patent: Apr. 19, 1994

[54] RUN LENGTH ENCODING METHOD AND SYSTEM

[75] Inventors: Rui-Fu Chao, Hsin-Chu; Yu-Cherng Chen, Chia-Yi; Ming-Hsu Tu, Tai-Chung, all of Taiwan

[73] Assignee: Industrial Technology Research Institute, Taiwan

[21] Appl. No.: 626,103

[22] Filed: Dec. 11, 1990

[51] Int. Cl.⁵ .............................. H04N 1/41
[52] U.S. Cl. .................... 358/261.1; 358/426
[58] Field of Search ......... 358/261.1, 261.2, 261.3, 358/426, 427; 382/56

[56] References Cited

U.S. PATENT DOCUMENTS

| | | | |
|---|---|---|---|
| 4,097,903 | 6/1978 | Nakagome et al. | 358/261.2 |
| 4,307,377 | 12/1981 | Pferd et al. | 358/261.3 |
| 4,360,840 | 11/1982 | Wolfrum et al. | 358/261.1 |
| 4,682,215 | 7/1987 | Adachi | 358/261.1 |
| 4,701,803 | 10/1987 | Sato | 358/261.1 |
| 4,799,110 | 1/1989 | Hisada et al. | 358/261.3 |

Primary Examiner—Edward L. Coles, Sr.
Assistant Examiner—Fan Lee
Attorney, Agent, or Firm—Darby & Darby

[57] ABSTRACT

A run length encoder for converting bi-level video image data made up of white and black representative pixel values to a run length code to be used by a vector processor including a transition detector for detecting the transition of inputted image data values from either white to black or black to white. The inputted image data are addressed along each scanned line. At every white to black transition, the pixel address is stored in memory. The number of continuous black pixels following this first transition is counted until a black to white transition is detected. The resulting count value corresponding to each stored address value for each black "run" is also stored in memory, wherein these stored values represent the run length code of the video image data for use with the vector processor.

1 Claim, 3 Drawing Sheets

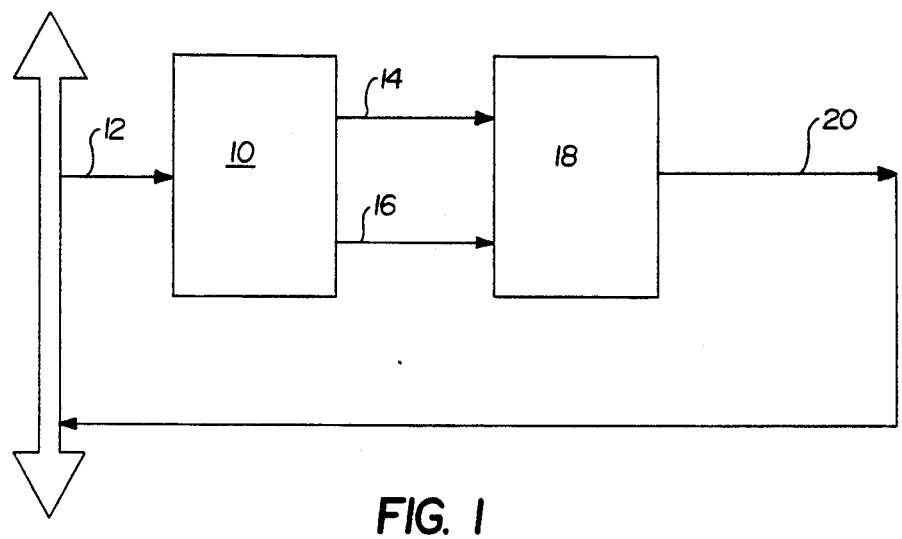
FIG. 1
FIG. 2
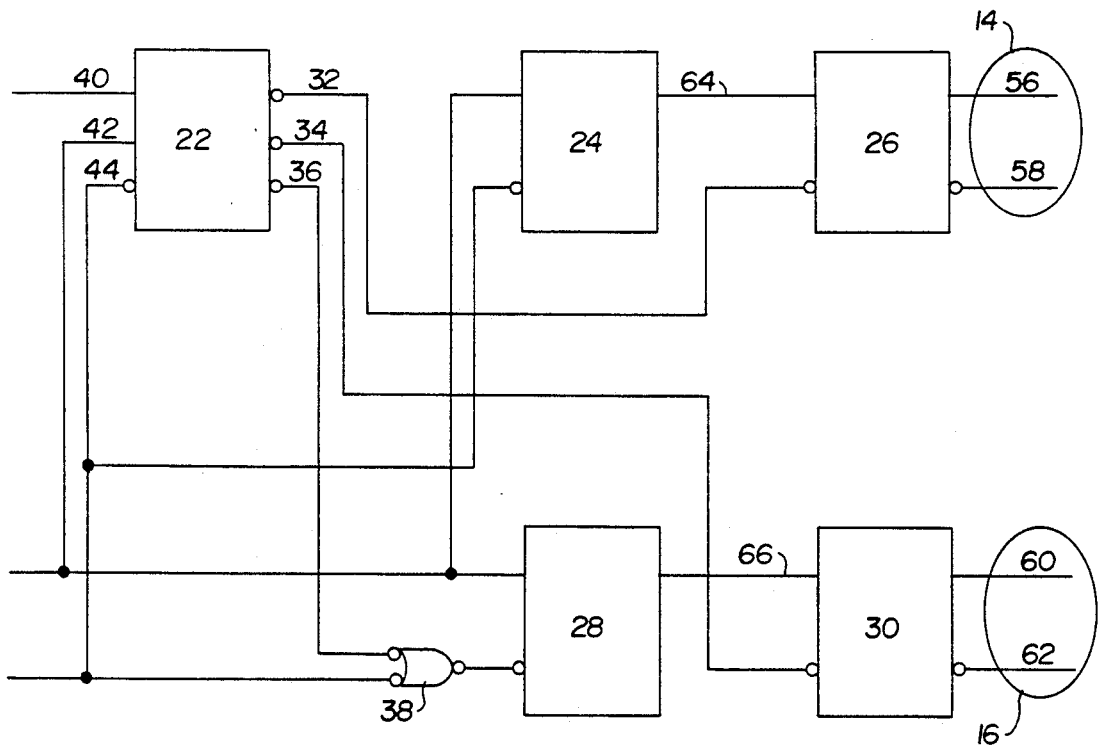

RUN LENGTH ENCODING METHOD AND SYSTEM

BACKGROUND OF THE INVENTION

This invention relates to run length encoding suitable for use in raster to vector processing.

Raster to vector (RTV) processing is a technique of image processing that converts bi-level image data to vector form. The advantages of vector form of image data are well known and include rapid data transmission, easy recognition, easy correction, and less memory storage.

However, not all formats of image data are suitable for vectorization. Consequently, before the bi-level image data are converted to vector form, the format of the image data must be changed to a more usable format.

One type of data format suitable for RTV processing is run length code (RLC). With this format, the white and black pixel runs (an uninterrupted series of picture elements of the same logic state) are converted into run length message codes.

However, the conventional run length encoder is not suitable for RTV processing because the run length message code it produces is in a compressed form. Consequently, in order for this compressed data to be suitable for RTV processing, the RTV processor must first prepare the data for RTV processing by decoding it from its compressed form. This preliminary decoding of the data consumes both valuable software memory and processing time.

Therefore, an object of the present invention is to provide a run length encoder and method for converting video image data into a suitable format which is immediately compatible with an RTV processor.

SUMMARY OF THE INVENTION

A run length encoder for converting bi-level image data to a run length code to be used by a vector processor is provided. The bi-level image data are made up of white and black representative pixel values. The run length encoder includes a transition detector for receiving the image data. The transition detector detects the transition of inputted image data values from either white to black or black to white. A means for addressing the inputted image data, pixel by pixel, is included with the present run length encoder, as well as means for storing the address value of the addressing means. The address storing means is responsive to the transition detector detecting a white to black transition of the image data. The run length encoder also includes a means for counting the pixels of the image data, wherein the counting means is responsive to the transition detector detecting the white to black transition of the image data. Finally, a means for storing the count value of the counting means is included with the present encoder. The count storing means is responsive to the transition detector detecting a black to white transition of the image data, wherein the stored address value and the stored count value represents the run length code of the image data for use with the vector processor.

BRIEF DESCRIPTION OF THE DRAWINGS

FIG. 1 is a general block diagram of an RTV processor showing the environment of the invention;

FIG. 2 is a general circuitry schematic showing details of a preferred embodiment of a run length encoder in accordance with the invention;

DETAILED DESCRIPTION OF THE PREFERRED EMBODIMENT

Figure 4:
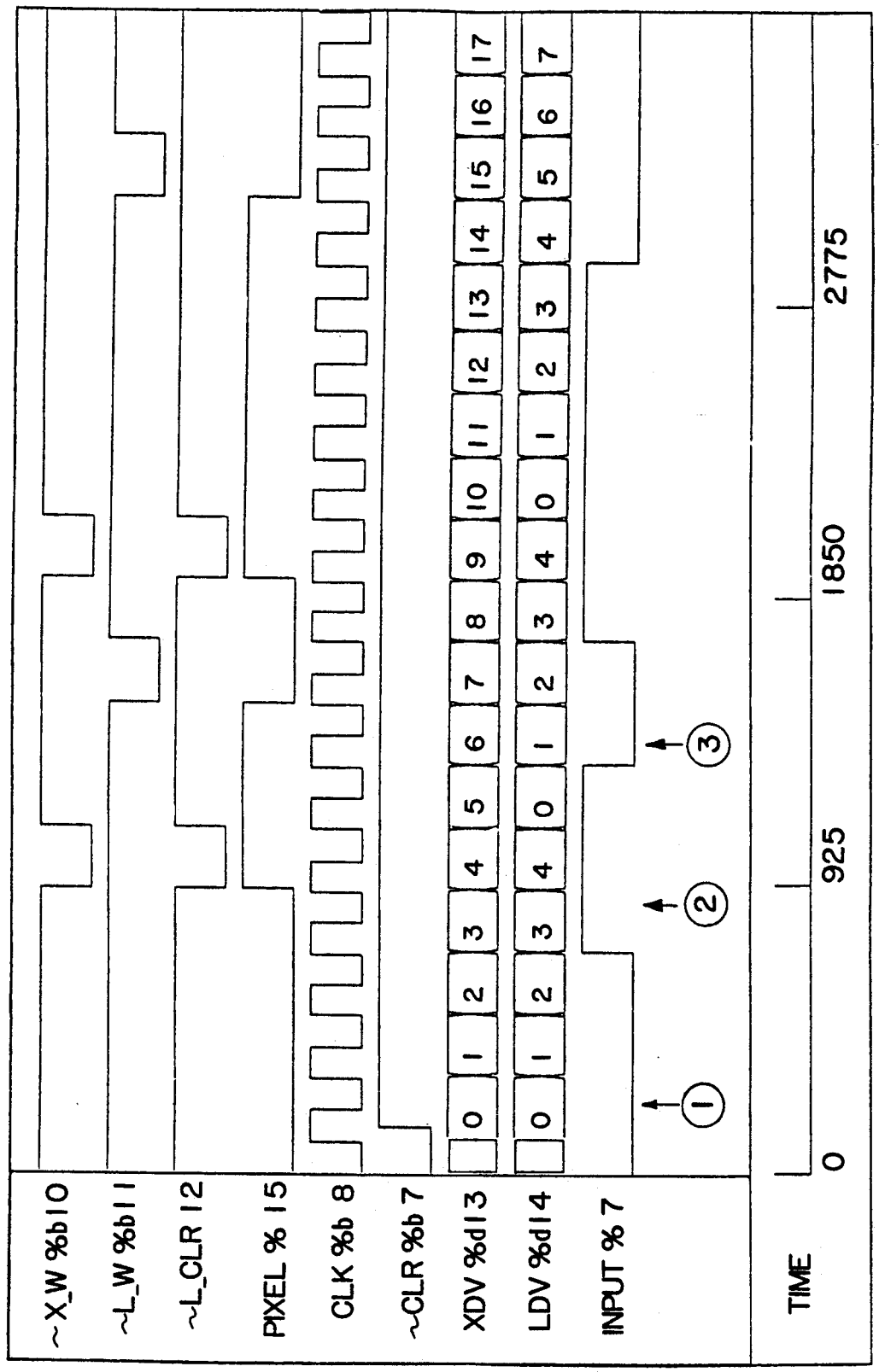
FIG. 4 is a timing circuit of the circuit shown in FIG. 2.

Referring to FIG. 1, a RTV system is shown using a run length encoder 10 to convert image data 12 (an input) to an address code 14 and a length code 16 (outputs). The run length encoder 10 of the present invention functions as a preprocessor for a raster to vector (RTV) processor 18. The output of encoder 10, the address and length codes, is in non-compressed run length format so it can be inputted directly to and rapidly processed by the RTV processor 18, thereby advantageously enabling rapid conversion of bi-level raster image data to vector form. Prior to the present invention, the run length code data were compressed which required decoding before processing by the RTV processor 18. The RTV processor 18 is conventional and therefore shown in block diagram.

As shown in FIG. 1, the bi-level image data, represented by reference line 12, are inputted to the run length encoder 10. The run length encoder 10 generates an address code 14 and a length code 16. These data, being in proper non-compressed format in accordance with the invention, are inputted to conventional vector processor 18 which subsequently generates vector data as its output, represented by arrow 20.

As conventionally known, black and white refer to two pixel *levels of video information; black being a brightness level above a specified parameter and white being a brightness level below the parameter. The address code of the RLC represents the starting address of the black pixel of the image data and is determined by the transition of the voltage from low (white pixel) to high (black pixel). The length code represents the continuous length of black pixels from the starting address as determined by the distance between the transition of voltage from high to low. The RLC of the present invention contains a starting address and a value representing the length of consecutive black pixels detected. The present RLC is therefore useful for RTV processing because the RTV processor manipulates only the black pixels of a scanned image.

Referring to Table I below, the address code and length code of a bi-level image data are illustrated by way of example:

TABLE I

| A. | Bi-Level Image Data | |
|---|---|---|
| | 0 0 1 1 0 0 1 1 1 1 1 1 0 0 | |
| CLOCK CYCLE | | |
| | High | |
| VOLTAGE | | |
| | Low | |
| | Run Length Code | |
| | Address Code | Length Code |
| | 2 | 2 |
| | 6 | 5 |
| B. | Bi-Level Image Data | |
| | 0 1 1 0 1 0 0 0 1 1 0 0 0 | |

TABLE I-continued

| CLOCK CYCLE | |
|---|---|
| VOLTAGE | High |
| | Low |
| Run Length Code | |
| Address Code | Length Code |
| 1 | 2 |
| 4 | 1 |
| 8 | 2 |

As shown in the first example, there are two transitions from low to high voltage. The first transition (0 to 1) occurs at address "2" and the continuous length of the high voltage (logic level 1) is "2" ("long"). The second transition from low to high occurs at address "6" and the continuous length of the high voltage is "5". In the Example B, three transitions from low to high voltage states occur, at address codes "1", "4", and "8", whereby the continuous length of black pixels is "2", "1" and "2" respectively. The above two examples show the compact, yet accurate format of the present RLC.

Figure 3:
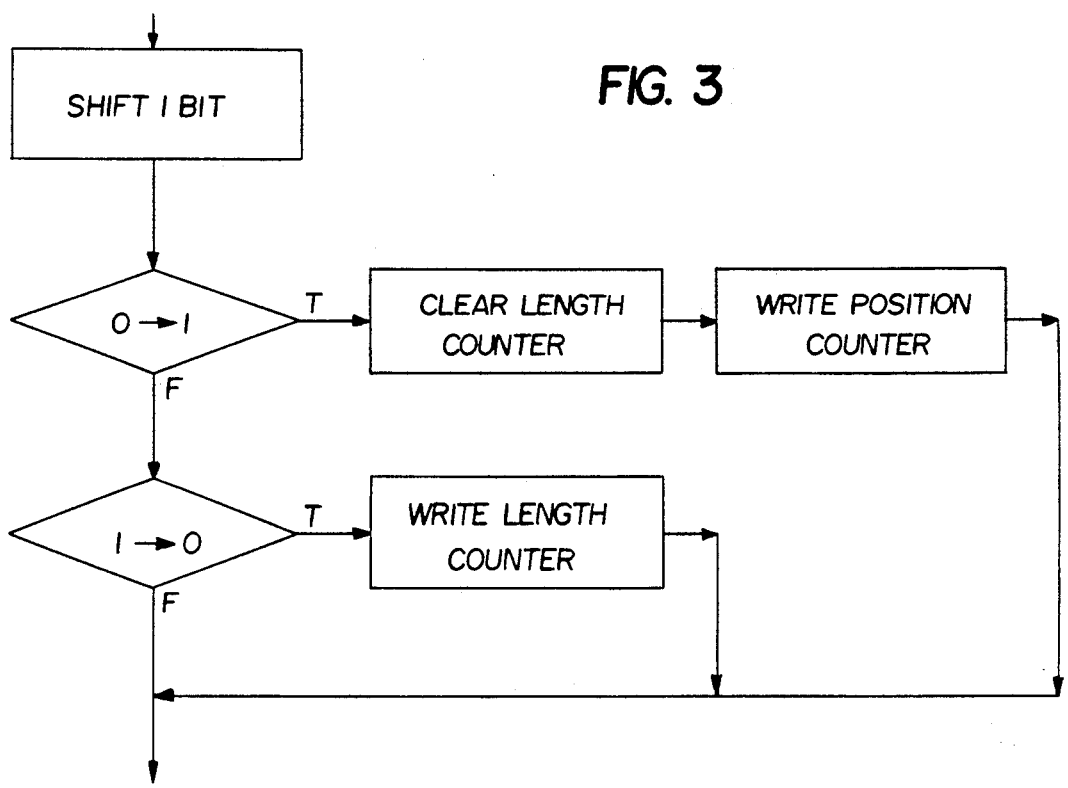
FIG. 3 is a flowchart of the method followed by the encoder in accordance with the invention.

FIG. 3 depicts a logistics flow chart summarizing the process carried out by the present invention for determining and storing the address code and length code of the bi-level image data. When the input image signal changes from 0 to 1 (white to black at block 70), the content of the length counter is cleared to zero (at block 72) and the content of the address counter is written into memory (at block 74). This new value in memory is the starting address of the first black pixel detected. When the input image signal changes from 1 to 0 (black to white at block 78), the content of the length counter is written into a separate memory (at block 76). After each image pixel is processed, one is added to the content of the address counter and length counter. This process is described in greater detail below.

With reference to FIGS. 2 and 3, the run length encoder 10 of the present invention is shown including a transition (up/down) detector 22 for detecting transitions between white and black pixels, an address counter 24 for counting the starting address of each continuous black run, an address memory 26, preferably a first-in-first-out (FIFO) buffer memory, for storing the starting address of each black run, a length counter 28 for counting the continuous length of a black run, and a length memory 30, preferably also a FIFO buffer memory, for storing the length of each continuous black run.

Transition detector 22 is coupled to a conventional video information source (not shown) to detect occurrences in black to white and white to black as the video image is scanned. Transition detector 22 produces an output signal upon the occurrence of each transition in the video input. There are three output lines 32, 34, and 36 from the transition detector 22. One line 32 is connected as an input to the address memory 26, another output line 34 is connected to the length memory 30, the last of the three output lines 36 from the transition detector 22 is connected indirectly to the length counter 28 by way of a NAND gate 38.

The transition detector 22 receives three main inputs, a video image data input 40, a clock signal input 42 and a clear signal input 44. The clear signal input 44 is also connected to the NAND gate 38 and the address counter 24. The length counter 28 and the address counter 24 both receive a clock signal which is in-sync with the clock signal of the clock signal input line 42.

Figure 5:
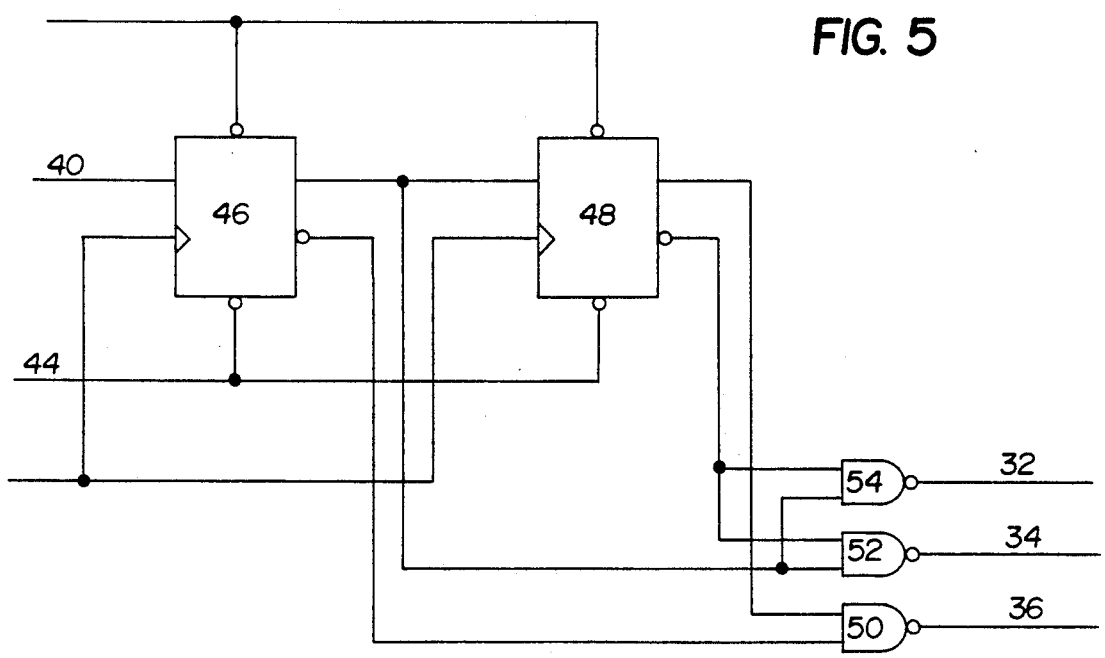
FIG. 5 is a detailed circuit diagram showing a transition detector of the encoder in accordance with the invention.

The transition detector 22, details of which are shown in FIG. 5, is used as a timing controller for the rest of the circuit shown in FIG. 2. Two D-type flip-flops 46, 48 are cascaded with various output combinations between the two connected to the inputs of three NAND gates 50, 52, 54. Since the D-type flip-flop delays the transition of its output to the input signal for a period of one cycle, depending on the output combination to the gates, various dynamic output controlling signals are generated with only a single input change. As those skilled in the art will appreciate, the transition detector 22 can be formed using a variety of standard electrical devices in a variety of circuit arrangements. As shown in FIG. 5, the signal input of the transition detector 22 is inputted to the flip-flop 46. The Q output of the first flip-flop 46 (timing line 8, FIG. 4) will have the same state (0 or 1) as the input signal after one clock cycle. The Q output is inputted as a delayed input signal to the second flip-flop 48. The bar-Q output (the complement of Q) of the first flip-flop 46 is (after one clock cycle) inputted directly to one NAND gate 50. The Q output of the second flip-flop 48 forms the second input to the NAND gate 50. The outputs of the second flip-flop 48 may have two states, one during the first and second clock cycles and a second thereafter, due to the delay generated by the cascaded flip-flops. The Q output of the flip-flop 46 is also inputted to the NAND gate 52 and NAND gate 54. The bar-Q output of the flip-flop 48 is inputted to both the NAND gate 52 and 54. Therefore, in operation of this detector arrangement, as an example, at t=0, the image input 40 (timing line 7, FIG. 4) changes from state 0 to 1, the Q output of the first flip-flop 46 will change from 0 to 1 after one clock cycle, (timing line 8, FIG. 4) t=1 (see the timing chart of FIG. 4) and the bar-Q output of the flip-flop 46 will similarly change from 1 to 0 after one clock cycle. NAND gate 50 will receive this new changed state from the bar-Q output (from 1 to 0) at t=1 and will combine it with the state remaining at its other input from the Q output of the second flip-flop 48, which will be state 0 from before. The Q output of the second flip-flop 48 will not change its state until two clock cycles have elapsed, t=2. The output line 32 of NAND gate 50 (and of the transition detector circuit 22) will remain state 1 for all cycles because, even though the Q output of the second flip-flop 48 changes from 0 to 1 at t=2, the other input of the NAND gate 50 remains 0 at t=2, as indicated by the timing line 10 of FIG. 4. However, the outputs 34 and 36 of the other two NAND gates 52 and 54 change dynamically at t=1 and again at t=2, as shown in FIG. 4, timing lines indicated by the numerals 11 and 12, respectively.

The Run Length Encoder (RLE) in accordance with the invention uses this delayed state output of the transition detector 22 for any single input state change as a controller for controlling the flow of information representing the particular change in state (i.e., from 0 to 1, when it occurs and for how long) between the address counter 24 and address memory 26 and between the length counter 28 (see timing line 14, FIG. 4) and the length memory 30.

Referring to FIG. 2, the three time-delayed outputs 32, 34, 46 of the transition detector circuit 22 are connected to, and control the activation of three standard circuits, a length counter 28, a length memory 30 and an address memory 26. As shown in FIG. 2, the output 32 of transition detector circuit 22 is connected to the "read" control node of the address memory 26. Memory 26 (and memory 30) may be any standard memory of the type first-in, first-out, usually in the form of an I.C. chip. A low state (0) along this line will enable the address memory 26 to read and store the data at its input terminals, which, as described below, is the address information (the current position along the scanned line) from the address counter 24. The output terminal 34 of the transition detector circuit 22 is connected directly to the read control node of the length memory 30. A low state (0) along at this node will enable the length memory 30 to read and store the information at its input terminals, which is length information (the duration of the high state) from the length counter 28. The last output 36 from the transition detector circuit 22 is connected to one input of NOR gate 38 having inverted inputs. The NOR gate 38 and the inverters are well known and any equivalent circuit may be used. The output of the NOR gate 38 is connected to the "write" control node of the length counter 28. The other input of the NOR gate 38 is connected to the clear signal 44. The clear signal 44 is also connected to the "clear/reset" terminal of the transition detector circuit 22 (both of the flip-flops 46, 48), the address counter 24, directly, and the length counter 28 indirectly through the NOR gate 38. The clock signal along line 42 is sent to the transition detector circuit 22, and the two counters, length 28 and address 24. The outputs 56 and 58 (which are collectively the address code output 14 of the address memory 26) and the outputs 60, 62 (which are collectively the length code output 16 of the length memory 30) are connected to the vector processor 18 as shown in FIG. 1.

The address counter 24, which enables tracking the starting address of each black pixel of the bi-level image data, is connected to the address memory 26 by line 64. The address memory 26 stores the starting address of each black pixel sequence. Length counter 28 which counts the number of continuous black pixels detected in any black pixel sequence (until detecting a white pixel) is indirectly coupled to the transition detector 22 by line 36 via the NOR gate 38. A line 66 also connects the length counter 28 to the length memory 30. The length memory 30 is, of course used to temporarily store any value read at the output terminals of the length counter, at least until the vector processor 18 "takes" the value from the length memory 30 for processing.

A clear signal (timing line 76, FIG. 4) is generated at any convenient time during the scanning procedure, such as after every row of data is processed. The clear signal resets the counters to zero.

In operation, (see FIG. 4) a starting address signal is sent out as a reference starting point for storage in address memory 26 before each row of the image is scanned. Eventually, as any particular image line is scanned, a black pixel will be detected as a transition in voltage (0 to 1). When this occurs, the address of the address counter is recorded by the address memory 26 and, simultaneously, a clear signal is generated to clear the length counter 28 to zero. Every future black pixel detected, prior to a transition to white, increments the length counter by 1. When the transition detector 22 detects a pixel transition to white, signifying an end of the continuous black pixel run, the line 34 instructs the length memory 30 to read the current value of the length counter 28 and store it for future use by the vector processor 18.

The vector processor 18 understands that for any starting address read from the address memory 26 there is a corresponding number of black pixels extending therefrom, indicating the length of a black pixel run. Between the end of the black pixel run and the next starting address, the processor assumes that the pixels are white, thereby saving both processing time and memory capacity.

The scanning of the particular row continues until either the end of the row or another black pixel is detected. If a black pixel is detected, line 32 once again instructs the address memory 26 to read the address of the address counter 24 and again store it for the vector processor, the length counter is cleared to zero and the procedure continues, as described above.

When the scanning line ends, the length memory 30 is instructed to make its final recording of the length counter 28 and a clear signal is generated to clear both counters 24 and 28 and the transition detector 22, in preparation for the next line to be scanned.

Depending on the software instructions of the vector processor 18, the length counter may be reset to a value of zero at the beginning of a new scanning line and reset to zero plus one in the event of a white to black transition since the first black pixel which causes the counter to reset should be counted in the length of the black run.

What is claimed is:

1. A run length encoder for converting bi-level image data made up of white and black representative pixel values to a run length code to be used by a vector processor, comprising:
   a transition detector for receiving said image data, said transition detector detecting the transition of inputted image data values from either white to black or black to white;
   means for addressing said inputted image data, pixel by pixel, along a scanned line of a video image;
   means for storing the address value of the addressing means, said address storing means being responsive to said transition detector detecting a white to black transition of said image data;
   means for counting said black pixels of said image data, said counting means being responsive to said transition detector and counting pixels after said transition detector detects said white to black transition of said image data;
   means for storing said count value of said counting means, said count storing means being responsive to said transition detector detecting a black to white transition of said image data, wherein said stored address value and said stored count value represent said run length code of said image data and are sent to said vector processor in response to said end-of-line detection means detecting the end of a scanned line of video image data;
   means for resetting said counter in response to said detection of a black to white transition;
   means for detecting the end of a scanned line of said video image data;
   wherein said resetting means is also responsive to said end-of-line detection means detecting the end of a scanned line of said video image data; and
   wherein said addressing means is reset in response to said end-of-line detection means detecting the end of a scanned line of said video image data.

* * * * *